(12) United States Patent
Hug et al.

(10) Patent No.: US 9,327,933 B2
(45) Date of Patent: May 3, 2016

(54) DEVICE AND METHOD FOR CONVEYING A SPRING STRING

(75) Inventors: Christopher Hug, St. Gallen (CH); Andreas Meier, Engelburg (CH)

(73) Assignee: Spuhl AG, Wittenbach (CH)

( * ) Notice: Subject to any disclaimer, the term of this patent is extended or adjusted under 35 U.S.C. 154(b) by 304 days.

(21) Appl. No.: 14/118,669

(22) PCT Filed: May 14, 2012

(86) PCT No.: PCT/EP2012/002068
§ 371 (c)(1),
(2), (4) Date: Feb. 4, 2014

(87) PCT Pub. No.: WO2012/159717
PCT Pub. Date: Nov. 29, 2012

(65) Prior Publication Data
US 2014/0166207 A1    Jun. 19, 2014

(30) Foreign Application Priority Data

May 20, 2011    (EP) .................................... 11004214

(51) Int. Cl.
*B29C 65/00*    (2006.01)
*B65H 20/00*    (2006.01)
*B68G 9/00*    (2006.01)
*B29C 65/78*    (2006.01)

(52) U.S. Cl.
CPC ............ *B65H 20/00* (2013.01); *B29C 65/7891* (2013.01); *B68G 9/00* (2013.01)

(58) Field of Classification Search
CPC ............. A47C 23/0436; A47C 27/064; A47C 27/068; B21F 27/16; B21F 33/025; B29C 65/7891; B65H 20/00; B68G 9/00
USPC ................. 156/351, 360, 361, 368; 226/4, 24; 140/3 CA See application file for complete search history.

(56) References Cited

U.S. PATENT DOCUMENTS 5,579,810 A * 12/1996 Ramsey .................. B21F 27/16
                                                140/3 CA
5,637,178 A *  6/1997 Suenens .................. B68G 9/00
                                                156/297

(Continued)

FOREIGN PATENT DOCUMENTS

CN    1158820    9/1997
CN    1174947    3/1998

(Continued)

OTHER PUBLICATIONS

International Searching Authority, Search Report issued in corresponding EP Application Serial No. 11004214.0, dated Aug. 10, 2012, 3 pages.

*Primary Examiner* — George Koch
(74) *Attorney, Agent, or Firm* — Wood, Herron & Evans, LLP

(57) ABSTRACT

A device for conveying a spring string (31) has a first spring conveyor (3) and a second spring conveyor (4). By means of a sensor device, in operation, lengths of a plurality of segments of the spring string differing from one another are detected, while the spring string (31) is guided past a sensor (5) of the sensor device arranged in the conveying direction upstream of the second spring conveyor (4). A control device (9) is provided which sets, in an operating state of the device (1) in which both the first spring conveyor (3) and the second spring conveyor (4) convey the spring string (31), time-sequentially a plurality of relative conveying speeds between a conveying speed of the second spring conveyor (4) and a conveying speed of the first spring conveyor (3), depending on the detected lengths.

24 Claims, 7 Drawing Sheets

(56) References Cited

U.S. PATENT DOCUMENTS

| | | | |
|---|---|---|---|
| 5,740,597 A | 4/1998 | Eto | |
| 5,746,877 A * | 5/1998 | Notheis | B68G 9/00 156/356 |
| 5,792,309 A * | 8/1998 | Eto | B68G 9/00 140/3 CA |
| 5,950,473 A * | 9/1999 | Andrea | B21F 33/04 140/3 CA |
| 6,155,310 A * | 12/2000 | Haubert | B21F 33/04 140/3 CA |
| 6,758,078 B2 * | 7/2004 | Wells | A47C 23/04 72/134 |

FOREIGN PATENT DOCUMENTS

| | | |
|---|---|---|
| EP | 0624545 | 11/1994 |
| EP | 0764608 | 4/2001 |
| WO | 9627553 | 9/1996 |
| WO | 02/092495 A1 | 11/2002 |

\* cited by examiner

DEVICE AND METHOD FOR CONVEYING A SPRING STRING

This application is a national stage entry of PCT/EP2012/002068, filed on May 14, 2012.

The invention relates to a device and a method for conveying a spring string. The invention relates, in particular, to a device and a method with which a pocket spring string can be conveyed to a spring core assembly apparatus.

To produce spring cores or pocket spring cores, machines or automatic machines are employed, with which a high degree of automation in the production of spring rows, pocket spring strings, spring cores or pocket spring cores can be achieved. Such machines or automatic machines can have a spring former for producing springs and also a plurality of stations arranged downstream thereof, in which the springs can be, for example, selectively rotated, arranged in rows, pocketed, conveyed to a spring core assembly apparatus and joined together to form a spring core or pocket spring core.

Spring cores usually comprise a certain number of juxtaposed and interconnected spring rows consisting of a multiplicity of springs arranged in a line and interconnected. For high-quality spring cores, the springs can be arranged in pockets which are interconnected. For this purpose, springs of the spring row can be welded in a tube made of thermoplastic material in pockets separated from one another. WO 96/27553 and EP 0 624 545 A1 describe installations, with which a spring string having a preset number of springs can be automatically produced and conveyed.

Conventional installations frequently do not allow variations in lengths of spring strings to be compensated. Such length deviations can lead to problems during the automatic combination of a plurality of spring strings in a spring core assembly apparatus and/or can lead to undesired deviations of the dimensions of produced spring cores from desired values.

WO 02/092495 A1 describes methods and devices which enable an adaptation of a length of a spring string so as to be able to compensate for deviations from a desired value at least to a certain extent. To compensate for such length deviations, provision is made for firstly in spring string section to be separated off from a continuous string and for the entire spring string section, i.e. the part which was previously separated as a unit from a continuous spring string, to be positioned in a transporting area. The actual total length of the spring string section is determined in the transporting area. A speed of conveying belts in a downstream transfer area is set, depending on a comparison between the actual total length and a desired length, in order to bring the spring string section to the desired length. These devices and methods allow compensation for undesired length variations before assembly to form a spring core takes place. However, the transporting area has to be dimensioned so as to be able to accommodate the entire spring string section. This may be undesirable with regard to space requirements and operating speed.

There exists a need for an improved device and an improved method for conveying springs to a spring core assembly apparatus. In particular, there exists a need for such a device and such a method which allows compensation for length variations before assembly of spring strings to form a spring core. Furthermore, there exists a need for such a device and such a method which allows such compensation for length variations to be carried out with smaller space requirements and/or higher operating speed.

According to the invention, a device and a method is specified, as defined in the independent claims. The dependent claims define advantageous or preferred exemplary embodiments.

The device and the method allow compensation for length variations in the length of a spring string which comprises a plurality of interconnected pocketed springs while the spring string is being transported to a spring core assembly apparatus.

According to one aspect, a device for conveying a spring string which has a plurality of interconnected pocketed springs is specified. The device comprises a first spring conveyor, a second spring conveyor arranged in the conveying direction downstream of the first spring conveyor, a sensor device and a control device. The sensor device is adapted to detect lengths of a plurality of segments of the spring string which differ from one another while the spring string is guided past a sensor of the sensor device arranged in the conveying direction upstream of the second spring conveyor. The control device is coupled to the sensor device and to a drive of at least one of the spring conveyors. The control device is adapted to set, in an operating state of the device in which both the first spring conveyor and the second spring conveyor conveys the spring string, time-sequentially a plurality of relative conveying speeds between a conveying speed of the second spring conveyor and a conveying speed of the first spring conveyor, depending on the detected lengths.

In the case of the device, lengths of segments of the spring string serve as a basis for a setting of the plurality of relative conveying speeds. As a result, it is no longer necessary to provide a buffer zone in which the entire spring string can be positioned and measured, in order subsequently to perform a length correction automatically. The space required for the device can thus be reduced. The time required for conveying the spring string to a spring core assembly apparatus can be reduced accordingly. As a result of the segmentwise length determination, it is also possible to perform a segmentwise length correction. As a result, particularly uniform spring spacings can be achieved when the spring string is fully positioned on the second spring conveyor and is ready for a transfer to a spring core assembly apparatus.

The plurality of relative conveying speeds can be determined depending on a comparison of the lengths determined for the different segments with a desired length in each case.

To set the relative conveying speed, a speed ratio of the conveying speed of the second spring conveyor to the conveying speed of the first spring conveyor can be set. The setting can be checked in each case and, if necessary, adapted when a new segment whose length has been previously determined reaches the transition from the first spring conveyor to the second spring conveyor.

The different segments can overlap one another. The different segments can each comprise a different number of springs. For example, a first segment can extend from a spring, frontmost in the conveying direction, up to an $N_{s0}$th spring of the spring string, where $N_{s0}$ is a whole number corresponding to the number of springs in the first segment. The further segments can extend from the frontmost spring up to an $(N_{s0}+k)$th spring of the spring string, where $1 \le k \le N-N_{s0}$ is a whole number and N is the total number of springs in the spring string.

The control device can be configured such that it determines an initial relative conveying speed by a comparison of the length determined for the first segment with the desired length for this segment. The control device can furthermore be configured such that it adapts the initial relative conveying speed depending on a comparison of the lengths determined for the further segments with the corresponding desired lengths. In this way, the relative conveying speed can be adjusted.

In a further configuration, the sensor device and the control device can be formed such that each of the segments can have a preset number of springs. When a spring string is transferred to the first spring conveyor, the number of springs can be counted by the sensor and in so doing the advance determined which the first spring conveyor requires to guide this number of springs past the sensor. This value corresponds to the length of the segment with the number of springs. Before a spring, frontmost in the conveying direction, of the spring string is transferred to the second spring conveyor, the second spring conveyor is started. The conveying speed of the second spring conveyor is chosen here initially depending on that for the segment, frontmost in the conveying direction, of the spring string. During the further movement of the spring string, the lengths of additional segments are determined. The conveying speed of the second spring conveyor can be correspondingly adapted when the corresponding segment reaches the transition from the first spring conveyor to the second spring conveyor.

The control device can be adapted to calculate positions of a plurality of springs of the spring string on the second spring conveyor, depending on the detected lengths and the set relative conveying speeds. The control device can be adapted to thus determine the positions of all the springs of the spring string on the second spring conveyor. This information can be used to control the spring core assembly apparatus. For example, spots of adhesive or lines of adhesive which, to join together spring strings, are applied to one of the spring strings, can be determined depending on the positions of spots of adhesive or lines of adhesive thus determined. An adhesive nozzle can be controlled depending on the positions.

The device can furthermore comprise a separating-off device for separating the spring string from a continuous spring string. The control device can be coupled to the separating device and adapted to set at least one of the plurality of relative conveying speeds before it activates the separating-off device to separate the spring string from the continuous spring string. In this way, compensation for length variations can be started even before the spring string is separated off from the continuous spring string.

The separating-off device can have a welding device for applying a weld at one end of the separated off spring string. The separating-off device can be adapted such that it forms a weld seam at the end of the separated-off spring string.

The device can comprise a transfer device for transferring the spring string to the first spring conveyor. The transfer device can be mounted so as to be movable in the conveying direction and can be transferrable from a holding state for holding the spring string to a releasing state for releasing the spring string, depending on a control signal of the control device. The control device can be adapted to generate the control signal with which the release of the spring string is effected, depending on a comparison of the conveying speed of the first spring conveyor and a movement speed of the transfer device in the conveying direction. In this way, a slip between the first spring conveyor and the head end of the spring string transferred to it can be reduced.

The first spring conveyor can have at least two conveying directions spaced from one another transversely to the conveying direction. The conveying devices can each be formed as circulating conveying belts. The transfer device can be configured and arranged to travel into a gap between the conveying devices spaced transversely to the conveying direction. A slip upon the transfer to the first spring conveyor can thereby be reduced.

The first spring conveyor can have two pairs of conveying devices spaced from one another in a first direction transverse to the conveying direction. The conveying devices can each be formed as circulating conveying belts. The pairs can be spaced from one another in a second direction perpendicular to the conveying direction, which is perpendicular to the first direction. By such a configuration, a sure and low-slip transfer to the first spring conveyor can be achieved.

The control device can be adapted to generate the control signal when a difference between the conveying speed of the first spring conveyor and a movement speed of the transfer device is of an amount which is less than a preset threshold value. In this way a slip between the first spring conveyor and the head end of the spring string transferred to it can be reduced. The sensor which is employed to detect the length of the plurality of segments can be provided in the conveying direction upstream of the first spring conveyor. Through the reduction of the slip between spring string and first spring conveyor, a sensor arranged in this manner also supplies reliable values for a length of the segments on the first spring conveyor.

The sensor whose output signal is used to determine the lengths of the segments can be arranged in the conveying direction downstream of an intake area of the first spring conveyor and upstream of a discharge area of the first spring conveyor.

The sensor device can comprise a further sensor which is arranged in the conveying direction upstream of the first spring conveyor and serves for detecting the lengths of the plurality of segments, wherein the control device can be adapted to set the plurality of relative conveying speeds furthermore depending on an output signal of the further sensor. Thus, the signals of a plurality of sensors spaced in the conveying direction can be combined with one another in order to increase the accuracy on the determination of the lengths of the segments. Alternatively, the sensor provided at the first spring conveyor can be dispensed with. If both the sensor at the first spring conveyor and the further sensor upstream of the first spring conveyor is present, the further sensor can be employed to count springs and seams between pocketed springs. The further sensor can be arranged upstream of the cutting-off device.

The first spring conveyor can have a length in the conveying direction which is less than a length of the spring string on the first spring conveyor. That is to say, the first spring conveyor can be dimensioned such that not the entire spring string can be positioned on it. "length of the spring string on the first spring conveyor" here denotes the length by which the first spring conveyor has to advance the spring string until the entire spring string has passed a preset point on the first spring conveyor.

The first spring conveyor can have an actuating drive. The control device can be adapted to query positions of the actuating drive to determine the lengths of the segments depending on an output signal of the sensor. In this way, the segment length can be determined by combining a relatively simple sensor, for example a distance sensor, with information provided by the actuating drive.

The sensor device can have at least two sensors spaced in a direction transverse to the conveying direction in order to detect a tilt of a spring of the spring string. The two sensors can be offset from one another in both directions which are transverse to the conveying direction. The second spring conveyor can have at least two actuating drives. The control device can be adapted to control the at least two actuating drives of the second spring conveyor depending on a tilt of the spring detected by the sensor device. As a result, in addition to the length correction, a correction of tilts can also be performed.

The first spring conveyor and the second spring conveyor can be arranged to convey the spring string in an orientation in which an axial direction of the pocketed springs is parallel to an axial direction of the springs when the latter are transferred to the spring core assembly apparatus. The first spring conveyor and the second spring conveyor can be arranged to convey the spring string in an orientation in which the axial direction of the pocketed springs is vertical. It is thereby not necessary to tilt the springs before a transfer to the spring core assembly apparatus. The processing time can be shortened.

The different segments whose length is ascertained can overlap one another.

According to a further aspect, an installation for producing a pocket spring core is specified, which installation comprises a device for conveying a spring string according to one aspect or exemplary embodiment and a spring core assembly apparatus. The spring core assembly apparatus is adapted to join together a plurality of spring strings, conveyed by the device, to form a pocket spring core.

Since the device for conveying can be compactly configured compared with conventional conveying devices which can compensate for length variations, the installation with conveying device and spring core assembly apparatus can also have a more compact configuration.

The device for conveying can be configured such that it calculates the positions of the springs of the spring string, depending on the determined lengths of the segments and the set relative conveying speeds, in the operating state in which the spring string is fully positioned on the second spring conveyor and is ready for a transfer to the spring core assembly apparatus. The control device can be adapted to control the spring core assembly apparatus depending on the determined positions. In this way, controllable elements of the spring core assembly apparatus can be controlled in specific dependence on the respective spring strings to be joined together.

The spring core assembly apparatus can comprise an application device for applying adhesive. The control device can be adapted to control an adhesive delivery by the application device as a function of time, depending on the determined positions. In this way, adhesive spots or adhesive lines can be accurately set. In so doing, it is not necessary for the positions of all the springs on the second spring conveyor or in the spring core assembly apparatus to be determined by a measurement.

The device can be arranged such that the first spring conveyor and the second spring conveyor convey the spring string in an orientation in which an axial direction of all the springs of the spring string is parallel to the direction in which the longitudinal axes of the springs point in the spring core assembly apparatus.

According to a further aspect, a method for conveying a spring string which has a plurality of interconnected pocketed springs is specified. The spring string is conveyed by a first spring conveyor and by a second spring conveyor arranged in the conveying direction downstream of the first spring conveyor. Lengths of a plurality of segments of the spring string which differ from one another are determined before the corresponding segment is conveyed by the second spring conveyor. Time-sequentially a plurality of relative conveying speeds between a conveying speed of the second spring conveyor and a conveying speed of the first spring conveyor are set, depending on the detected lengths, while both the first spring conveyor and the second spring conveyor convey the spring string.

Positions of a plurality of springs of the spring string on the second spring conveyor can be calculated depending on the detected lengths and the set relative conveying speeds.

A spring core assembly apparatus can be controlled depending on the calculated positions. In particular, an adhesive delivery by an element of the spring core assembly apparatus can be controlled depending on the calculated positions.

The spring string can be separated off from a continuous spring string, the separating-off taking place only after at least one of the plurality of relative conveying speeds has been set.

The spring string can be transferred to the first spring conveyor at a transfer speed, the conveying speed of the first spring conveyor being set such that a difference between the transfer speed and the conveying speed of the first spring conveyor is of an amount which is less than a preset threshold value.

A length of the first spring conveyor can be less than a length of the spring string on the first spring conveyor.

The spring string can be conveyed such that an axial direction of the springs when the spring string is conveyed by the first spring conveyor and the second spring conveyor is parallel to an axial direction of the springs when the spring string is joined to at least one further spring string.

The method can be carried out by the device for conveying springs according to one aspect or exemplary embodiment.

The advantages of the embodiments of the method correspond to the advantages of the corresponding device.

According to a further aspect, a method for producing a pocket spring core is specified, in which a plurality of spring strings are each transported using the method for conveying a spring string according to one exemplary embodiment to a spring core assembly apparatus and joined together by the spring core assembly apparatus to form a pocket spring core.

The invention is explained in more detail below using exemplary embodiments with reference to the appended drawing.

Exemplary embodiments of the invention are explained in more detail below. The features of the various exemplary embodiments may be combined with one another unless this is expressly excluded in the following description. Even though individual exemplary embodiments are described with regard to specific applications, for example in the context of an installation in which a continuous pocket spring string is supplied, the present invention is not limited to these applications.

In the case of devices according to exemplary embodiments, interconnected pocketed springs of a spring string are conveyed in a conveying direction. The conveying direction may be, but does not have to be, the same throughout the installation. Expressions such as "arranged in the conveying direction upstream of . . . " or "arranged downstream of" are to be understood in conventional plant-engineering terminology to mean that a conveyed pocketed spring passes the corresponding element upstream or downstream of another element.

Figure 1:
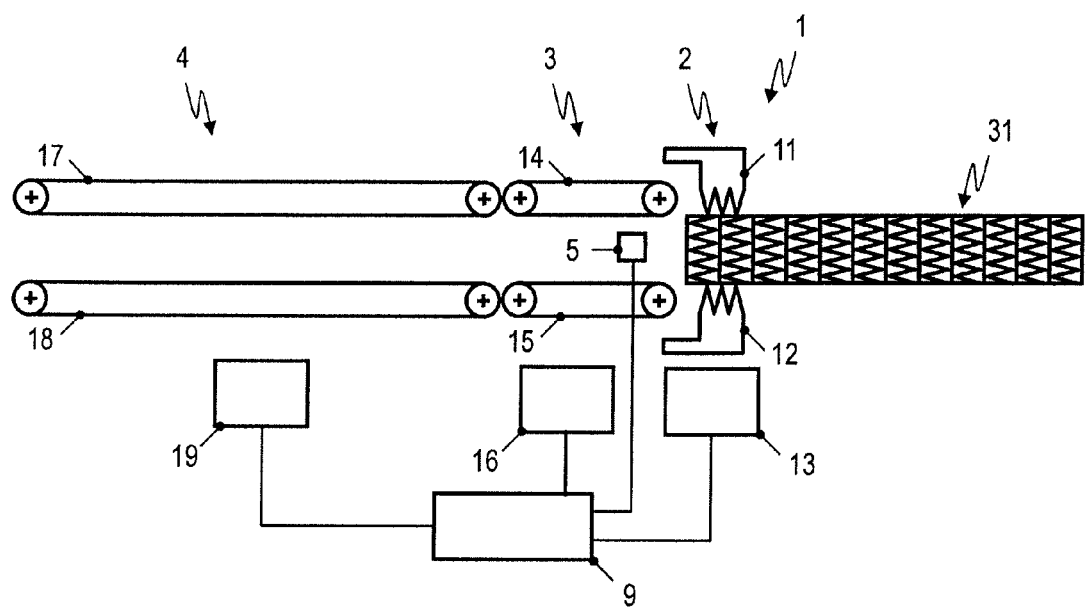
FIG. 1 is a schematic sectional view of a device for conveying springs in a vertical section plane.

FIG. 1 is a schematic representation of a device 1 for conveying a spring string 31 according to one exemplary embodiment. The spring string 31 has a plurality of pocketed springs, the pocketed springs being interconnected by the pocket material or otherwise to form the spring string 31. The spring string 31 may initially still be arranged at the head end of a continuous spring string before being separated off from the latter by the device 1.

The device 1 has a first spring conveyor 3 and a second spring conveyor 4. The first spring conveyor 3 receives the spring string 31 and conveys it onwards to the second spring conveyor 4. Springs of the spring string 31 which are delivered by the first spring conveyor 3 can be transferred directly to the second spring conveyor 4. Auxiliary elements, such as rollers or a camshaft, can be provided in the transition area between the first spring conveyor 3 and the second spring conveyor 4, in order to assist with the transfer of the spring string from the first spring conveyor 3 to the second spring conveyor 4.

The first spring conveyor 3 can have a length in the conveying direction (i.e. in the horizontal direction in FIG. 1-4) which is less than the length of the spring string 31. That is to say, the spring string 31 can never be fully positioned on the first spring conveyor 3. The length of the first spring conveyor 3 can, in particular, also be less than a desired length which the spring string 31 is to have upon its transfer to the spring core assembly apparatus.

The device 1 comprises at least one sensor 5 and a control device 9. The control device 9 is an electronic arithmetic unit which can comprise one or more processors. The sensor 5 is arranged in the conveying direction upstream of the second spring conveyor 4, so that a pocketed spring is transported past the sensor 5 before reaching the second spring conveyor 4. By using an output signal of the sensor 5, the length of segments of the spring string 31 can be detected before the corresponding segments reach the second spring conveyor 4. The sensor 5 can be configured as a relatively simple sensor, for example a distance sensor, which can detect when a spring is transported past the sensor 5. To determine the length, the output signal of the sensor 5 can be combined with further signals. For example, the first spring conveyor 3 can have a servomotor 16. By combining the output signal of the sensor 5, with which it can be determined when a pocketed spring is conveyed past the sensor 5, with the corresponding position of the servomotor 16 at this point in time, it is possible to determine what advance of the first spring conveyor 3 is required to convey a segment with a preset number of springs past the sensor 5. It is thus possible to determine the length of this segment before the entire segment is transferred to the second spring conveyor 4.

The control device 9 compares the determined length of the segment with a desired length. A relative conveying speed between a conveying speed of the first spring conveyor 3 and a conveying speed of the second spring conveyor 4 will be set depending on the determined length. For this purpose, the control device 9 can determine a quotient between the desired length and the determined actual length, $L_{desired}/L_{actual}$, of the corresponding segment. The conveying speed $v_2$ of the second spring conveyor can then be set, for example, as $v_2 = v_1 \cdot L_{desired}/L_{actual}$. Alternatively, it is possible to determine an additive speed offset by which $v_2$ differs from $v_1$, depending on the quotient between desired and actual length. A corresponding change of the conveying speed of the second spring conveyor 4 is carried out at the point in time at which a spring, which is frontmost in the conveying direction, of the corresponding segment reaches the transition between the first spring conveyor 3 and the second spring conveyor 4. The position of the sensor 5 relative to the transition between the first spring conveyor 3 and the second spring conveyor 4 is known, so that this point in time can likewise be determined from the advance of the first spring conveyor 4. Instead of adapting the conveying speed of the second spring conveyor 4, a correspondingly opposite adaptation of the conveying speed of the first spring conveyor 3 may also be effected when the spring, which is frontmost in the conveying direction, of the corresponding segment reaches the transition between first spring conveyor 3 and second spring conveyor 4.

The relative conveying speed is set here by the control device 9 in each case such that the length of the segment determined upstream of the second spring conveyor 4 changes to the desired length when the segment has been completely transferred to the second spring conveyor 4. If the advance of the first spring conveyor 3 which is required in order to guide a segment past the sensor 5 is less than the desired length of the segment, the relative conveying speed is set such that the conveying speed of the second spring conveyor 4 is greater than the conveying speed of the first spring conveyor 3. If the advance of the first spring conveyor 3 which is required in order to guide a segment past the sensor 5 is greater than the desired length of the segment, the relative conveying speed is set such that the conveying speed of the second spring conveyor 4 is less than the conveying speed of the first spring conveyor 3. The speed quotient $v_2/v_1$ on transferring the respective segment from the first spring conveyor 3 to the second spring conveyor 4 is thus chosen, depending on a comparison of the actual length of the segment measured upstream of the second spring conveyor 4 with the desired length of the segment, to be selectively either greater or less than 1.0.

The segments comprise in each case a plurality of springs. The segments can overlap one another. In this case, segments having a different number of springs can also be used for the length determination and subsequent setting of the relative conveying speed, it then being possible for the desired length to differ in each case.

The length determination and adaptation of the relative conveying speed is carried out by the control device 9 by segmentwise length determination and corresponding setting of the relative conveying speeds for a plurality of segments of the spring string 31. It is not necessary to position the entire spring string 31 first in a buffer area in order to determine its length there. The continued determination of lengths of segments and corresponding setting of relative conveying speeds while the spring string 31 is partly positioned on the second spring conveyor 4 and partly on the first spring conveyor 3 allows the first spring conveyor 3 to be configured more compactly compared with conventional installations which allow setting of the length.

If, depending on the output signal of the sensor 5, it can be determined at which position of the servomotor 16 a specific point of the pocketed spring, e.g. a weld seam, is guided past the sensor 5, this information can also be used to determine points in time at which the relative conveying speed is adapted. Furthermore, the control device 9 can combine this information with the conveying speeds known as a function of time, in particular with the different set relative conveying speed, to determine positions of all the springs of the spring string 31 when the latter is fully arranged on the second spring conveyor 4 and is ready for a transfer to the spring core assembly apparatus.

Figure 12:
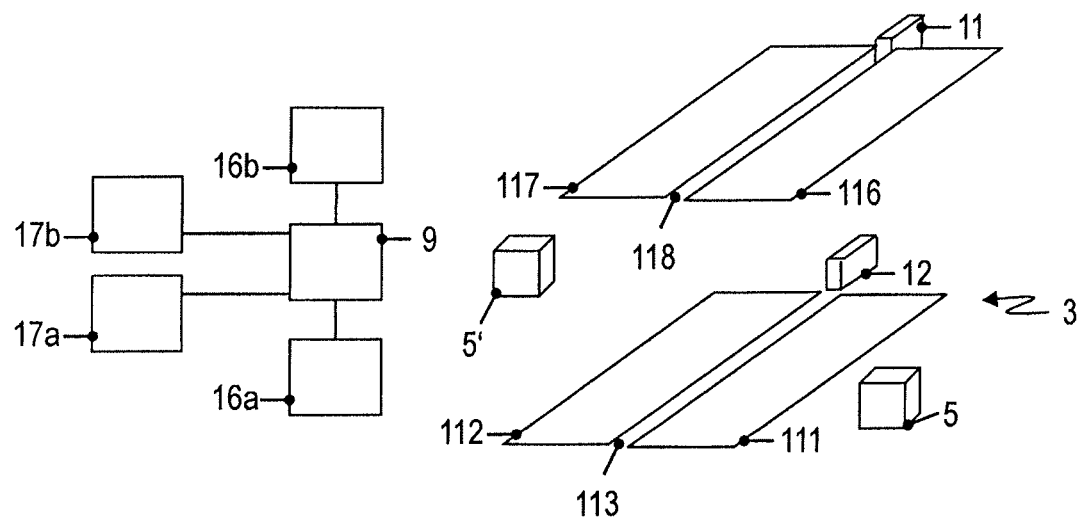
FIG. 12 is a schematic perspective view of a first spring conveyor of a device for conveying springs.

The first spring conveyor 3 and the second spring conveyor 4 can have different configurations. For example, each of the spring conveyors can comprise a pair of circulating conveying belts and a servomotor which drives one or both of the conveying belts. The first spring conveyor 3 can comprise circulating conveying belts 14 and 15, between which the pocketed springs of the spring string 31 are frictionally held. As will be described in more detail with reference to FIG. 12, the first spring conveyor can comprise two pairs of circulating conveying belts. A servomotor 16 drives the conveying belts 14 and 15. The servomotor 16 is coupled to the control device 9. The control device 9 can thus control the conveying speed of the first spring conveyor 3. In addition, by a suitable query of the servomotor 16 or of the program module responsible for controlling the servomotor 16, it is possible to obtain information about the advance of the first spring conveyor 3 which is used to determine the lengths of a plurality of segments of the spring string 31.

The second spring conveyor 4 can comprise circulating conveying belts 17 and 18, between which the pocketed springs of the spring string 31 are frictionally held. A servomotor 19 drives the conveying belts 17 and 18. The servomotor 19 is coupled to the control device 9. The control device 9 can thus control the conveying speed of the second spring conveyor 4 depending on the lengths of the segments.

The circulating conveying belts of the spring conveyors can be configured such that a spacing between the conveying belts can be adjusted. In this way, adaptation to different spring heights can take place.

The device 1 can have a transfer device 2 which feeds a head end of the spring string 31 to the first spring conveyor 3. The transfer device 2 can be configured as a push-in device or a draw-in device. The transfer device 2 can have a pair of engaging elements 11, 12 which can grasp the opposite axial ends of the spring string 31. The transfer device 2 can be transferred between a holding state, in which it grasps a spring string, and a releasing state for releasing the spring string. For this purpose, the control device 9 can provide a corresponding control signal. In addition, the engaging elements 11, 12 can be mounted so as to be movable in the conveying direction and can be drivable in the conveying direction by a drive 13. The engaging elements 11, 12 can be arranged such that the engaging element 11 can travel into a gap between two upper conveying belts of the first spring conveyor 3, and that the engaging element 12 can travel into a gap between two lower conveying belts of the first spring conveyor 3.

The control device 9 can control the transfer device 2 and the first spring conveyor 3 such that slip between the spring string 31 and the first spring conveyor 3 is reduced. For this purpose, the control device 9 can control the first spring conveyor 3 such that it is accelerated to a conveying speed which differs by less than a threshold value from the movement speed of the transfer device 2 in the conveying direction. Only then is the spring string 31 released, so that the latter is conveyed onwards by the first spring conveyor 3. The control device 9 can control the first spring conveyor 3 such that the conveying speed of the first spring conveyor at the point in time at which the transfer device 2 releases the spring string 31 is equal to the movement speed of the engaging elements 11, 12 in the conveying direction.

If slip between the spring string 1 and the first spring conveyor can be largely reduced, the sensor 5, whose output signal is used to determine length of the segments of the spring string 31, can also be provided in the conveying direction upstream of the first spring conveyor 3. This allows a further shortening of the first spring conveyor 3.

In addition to a sensor 5 positioned at the first spring conveyor, it is also possible to provide an additional sensor which is provided in the conveying direction upstream of the first spring conveyor. By using the output signals of both sensors, the accuracy with which lengths of segments are determined can be increased. Alternatively or additionally, the additional sensor arranged in the conveying direction upstream of the first spring conveyor can also be used to count springs and weld seams.

The device 1 can also have further functional units. The device 1 can have, in particular, a separating-off device (illustrated only in FIGS. 5 and 6) which separates off the spring string 31 from the rest of the continuous spring string. The separating-off device can be controlled by the control device 9 such that the spring string 31 is separated off from the rest of the continuous spring string after a head end of the spring string 31 has already been positioned on the second spring conveyor 4. An adaptation of the relative conveying speeds depending on determined lengths of the segments can thus take place even before the spring string 31 has been separated off from the rest of the continuous spring string. The separating-off device can be configured such that it severs and welds the thermoplastic tube in which the springs are pocketed.

Figure 2:
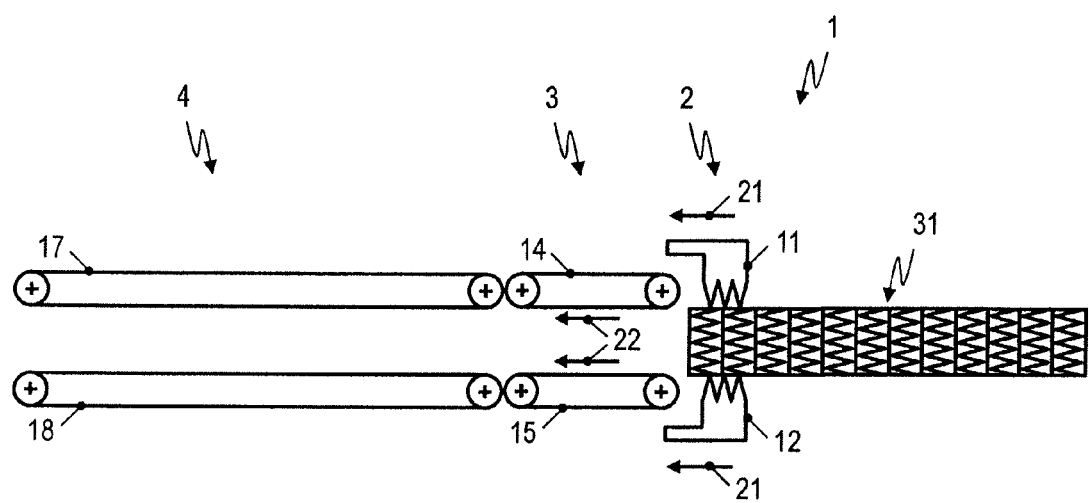
FIGS. 2-4 are schematic sectional views of the device of FIG. 1 at different points in time for explaining a method for conveying a spring string.
Figure 3:
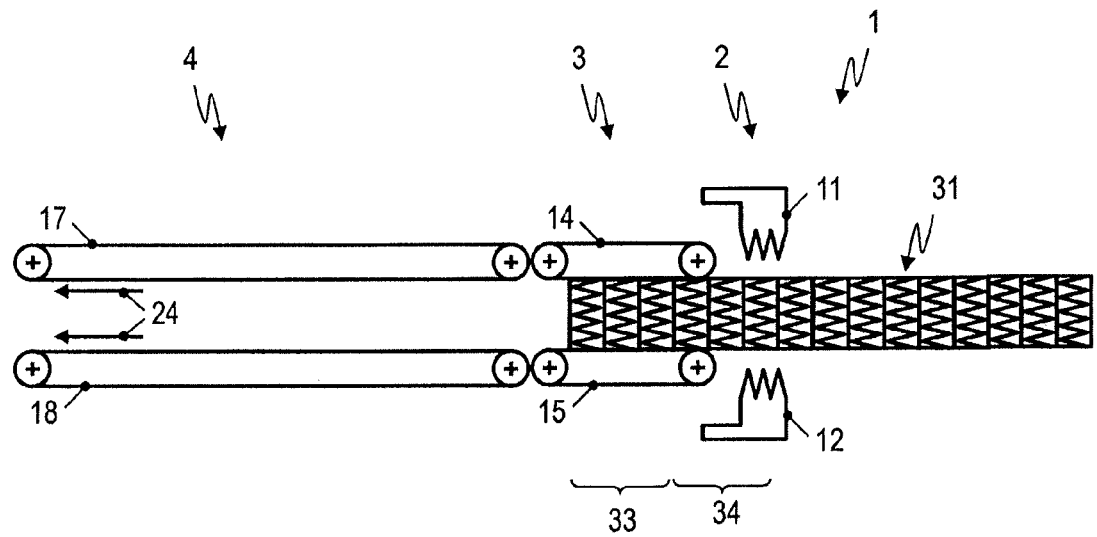
Figure 4:
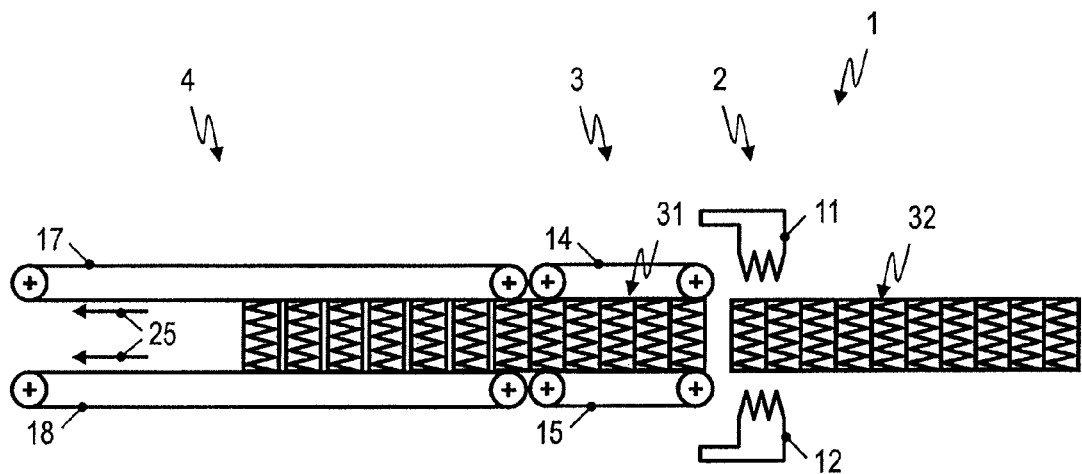

With reference to FIGS. 2-4, the functioning of the device 1 for conveying the spring string is further explained. Structural elements such as drives or control device are not illustrated in FIGS. 2-4 for reasons of clarity.

FIG. 2 shows a state in which the transfer device 2 has grasped a head end of the spring string 31 in order to transfer the spring string 31 to the first spring conveyor 3. The spring string 31 can in this state still be arranged at the head end of a continuous spring string and be connected to the rest of the continuous spring string.

The transfer device 2 is moved in the conveying direction at a movement speed 21. The first spring conveyor 3 is controlled such that a movement speed 22 at the opposite inner sides of the two conveying belts 14 and 15 corresponds substantially to the movement speed 21 of the transfer device 2 and thus of the spring string 31. When the conveying speed 22 of the first spring conveyor is equal to the movement speed 21 and the spring string 31 is introduced between the conveying belts 14 and 15 of the first spring conveyor 3, the transfer device 2 releases the spring string 31. The latter is conveyed onwards by the first spring conveyor 3.

FIG. 3 shows a state in which a head end of the spring string 31 is positioned on the first spring conveyor. Before segments 33, 34 of the spring string 31 are transferred to the second spring conveyor 4, their actual length is determined on the first spring conveyor 3. The relative conveying speed between the conveying speed of the second spring conveyor 4 and the conveying speed of the first spring conveyor 3 is set such that upon the transfer of the respective segment a length change from the actual length, which has been determined on the first spring conveyor 3, to the desired length on the second spring conveyor 4 takes place.

The particular relative conveying speed can, for example, be a speed quotient between the conveying speed of the second spring conveyor 4 and the conveying speed of the first spring conveyor 3. The conveying speed 24 of the second spring conveyor 4 can be set such that the corresponding speed quotient is present while the corresponding segment is being transferred from the first spring conveyor 3 to the second spring conveyor 4. Alternatively, in particular in the case of overlapping segments, a readjustment of a speed quotient can take place if segments of increasing length are measured.

Lengths are determined segmentwise before the corresponding segment is fully transferred to the second spring conveyor. Correspondingly, the relative conveying speeds are determined segmentwise.

FIG. 4 shows a state in which a head end of the spring string 31 is already positioned on the second spring conveyor 4 and the spring string 31 has been separated off from the rest of the continuous spring string.

To separate off the spring string 31, both spring conveyors 3, 4 are stopped synchronously. The separating-off device cuts off the tube of the pocket material and welds the tube at the end of the spring string 31. At this point in time, the head end of the spring string 31 is already situated on the second spring conveyor 4. Correspondingly, one or more adaptations of the relative conveying speed is or are already carried out before the spring string 31 is separated off and welded at its rear end.

After the separating-off, both spring conveyors are restarted, a relative conveying speed being set by the control device 9 depending on the ratio of actual length to desired length for one of the segments for which the comparison of actual length to desired length has been previously performed. The conveying speed 25 of the second spring conveyor 4 and the conveying speed of the first spring conveyor 3 are set correspondingly.

The determination of lengths of segments of the spring string 31 and/or the setting of further relative conveying speeds can be continued correspondingly after the separating-off of the spring string.

While in FIG. 3 two segments 33, 34 which do not overlap are schematically represented, the adjustment of the relative conveying speed can advantageously also take place when the segments overlap one another.

Figure 5:
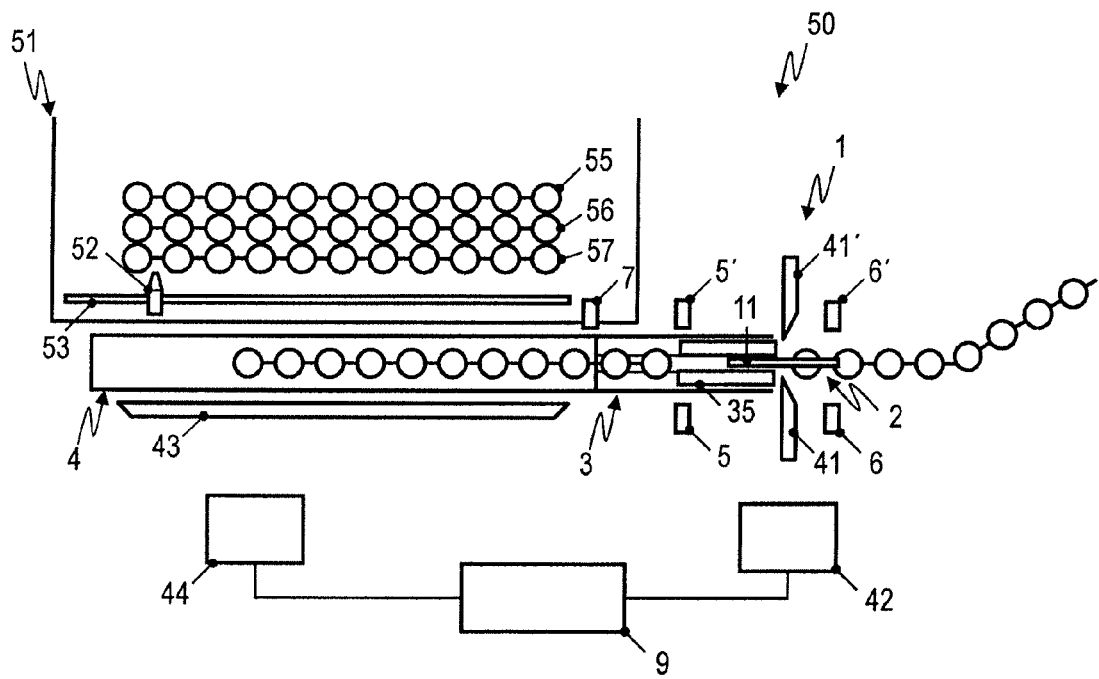
FIG. 5 is a schematic plan view of an installation having the device of FIG. 1 and a spring core assembly apparatus.
Figure 6:
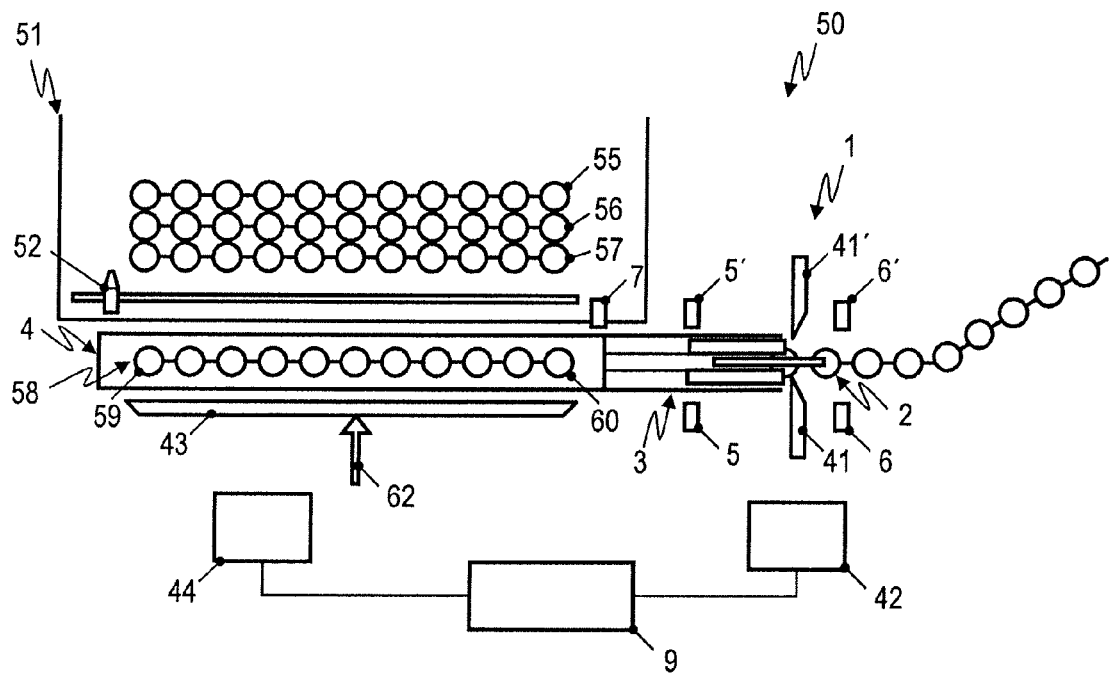
FIG. 6 is a schematic plan view of the installation of FIG. 5 at another point in time for explaining the method for conveying a spring string.

FIG. 5 and FIG. 6 show a schematic plan view of an installation 50 having the device 1 for conveying spring strings and a spring core assembly apparatus 51.

The device 1 can have the features and elements described with reference to FIGS. 1-4. In particular, the first spring conveyor 3 and the second spring conveyor 4 can each have an actuating drive which is controlled by the control device 9. The engaging element 11 of the transfer device 2 is mounted so as to be movable in the conveying direction in a linear guide 35. The engaging element 11 can be mounted such that in operation it can travel between a pair of upper conveying belts of the first spring conveyor.

In the case of the device 1, there may be provided, as illustrated in FIG. 5 and FIG. 6, a plurality of sensors 5, 5', 6, 6', the output signals of which are used to determine the lengths of segments of the spring string. One sensor 5 or a pair of sensors 5, 5' is positioned at the first spring conveyor 3. A further sensor 6 or a pair of sensors 6, 6' is positioned in the conveying direction upstream of the first spring conveyor 3. The distance of the sensor 5 from the further sensor 6 is known. Output signals of the sensor 5 and of the further sensor 6 can be combined in order to be able to determine the length of the segment with greater accuracy. In this way, for example an averaging of the advance of the first spring conveyor 3 which is required to guide a preset number of pocketed springs past the sensors 6, 6', and of the advance of the first spring conveyor 3 which is required to guide the same segment of the spring string past the sensors 5, 5' can be carried out to determine the length of the segment.

Alternatively or additionally, output signals of the sensors 6, 6' can be used to count springs and weld seams.

By using a pair of sensors 5, 5' and/or 6, 6', the number of measurement points obtained can be further increased. For a pair of sensors which scans opposite sides of the spring string, it is possible, in each case depending on the output signal of each of the sensors, to determine the position of the actuating drive of the first spring conveyor at which the longitudinal axis of the pocketed spring passes the corresponding sensor. By averaging, the reliability of the particular value of manipulated variable can be increased.

The sensors 5, 5' can be arranged not only such that they scan different sides of the spring string, but can also be offset from one another along the longitudinal axis of the springs. That is to say, the sensors 5 and 5' can be offset from one another both along a first direction which is perpendicular to the conveying direction, and in a second direction which is perpendicular to the conveying direction and to the first direction. As a result, the sensors 5 and 5' can also be used to detect and to correct a tilt of springs. This will be described in more detail with reference to FIG. 13.

The device 1 can have a sensor 7 which is positioned at the second spring conveyor 4. With the sensor 7 it is possible to detect a beginning and an end of the spring string, and/or it is possible to count the total number of springs of the spring string. In this way, in the event of deviations from desired values of the total length or the total number of springs, the operation of the installation 50 can be stopped and a warning signal issued.

The control device 9 can employ output signals of all the sensors 5, 5', 6, 6' and 7 or some of these sensors to check whether an error is missing or whether a weld seam between pocketed springs of the spring string has not been provided. In the event of an error, the operation of the installation 1 can again be stopped and a warning signal issued.

The device 1 can have a separating-off device with separating-off elements 41, 41' which are mounted so as to be movable at least transversely with respect to the conveying direction. The separating-off device has a drive 42 which is controlled by the control device 9 in order to separate off a spring string from the rest of the continuous spring string and weld it. These operations can be coordinated, as described with reference to FIGS. 1-4, with the operation of the first spring conveyor 3 and the second spring conveyor 4.

The device 1 has a transfer device 43, with which the spring string can be transferred to the spring core assembly apparatus 51. The control device 9 controls the drive 44 of the transfer device 43 such that a spring string which is positioned in a desired end position on the second spring conveyor is transferred from the transfer device 43 to the spring core assembly apparatus 51.

In the installation 50, the pocketed springs are conveyed such that an axial direction of the springs in the first and second spring conveyor is parallel to an axial direction of the springs in the spring core assembly apparatus 51. The springs can be conveyed such that their axial direction is vertical.

The spring core assembly apparatus 51 is configured to interconnect different spring strings. The control device 9 can, depending on the lengths of segments of the spring string which are detected upstream of the second spring conveyor 4 and depending on the relative conveying speeds which are set, calculate where the individual springs are positioned on the second spring conveyor 4 when the spring string is transferred to the spring core assembly apparatus 51. This information can be used to control the spring core assembly apparatus 51.

The spring core assembly apparatus 51 can have an adhesive nozzle 52 in order to apply spots of adhesive or lines of adhesive to a spring string transferred to the spring core assembly apparatus 51. When the following spring string is transferred to the spring core assembly apparatus 51, the spring strings are bonded along the set spots of adhesive or lines of adhesive.

The adhesive nozzle 52 is linearly movable. The adhesive nozzle 52 can be attached to a guide 53 extending parallel to the second spring conveyor 4. A drive (not illustrated) moves the adhesive nozzle 52 along a spring string 57 which has been transferred to the spring core assembly apparatus 51 and is already connected to spring strings 55 and 56. The drive can move the adhesive nozzle 52 at a constant speed along the spring string 57. Undesired drop formation can thereby be reduced.

An on/off state of the adhesive nozzle 52 as a function of time is controlled by the control device 9. In this regard, the on/off state and thus the adhesive delivery can take place depending on the calculated positions of the springs of the spring string 57 which the control device 9 calculates from the measured segment lengths and set relative conveying speeds.

The application of lines of adhesive or spots of adhesive to the spring string 57 can take place so as to overlap in time with the transporting of the following spring string through the first spring conveyor 3 and second spring conveyor 4. In this way, a desired length of the following spring string can be set and the latter can be positioned for a transfer to the spring core assembly apparatus at the same time as lines of adhesive or spots of adhesive are being applied to the spring string 57. A higher operating speed of the installation 50 can thereby be achieved.

FIG. 6 shows the installation 50 in a state in which the spring string 58 is positioned for a transfer to the spring core assembly apparatus 51. The total length between a spring 59 which is frontmost in the conveying direction and a rearmost spring 60 of the spring string 58 has been set during the conveyance. The transfer device is displaced in a direction 62 in order to transfer the spring string 58 to the spring core assembly apparatus 51.

In parallel with the transfer of the spring string 58 to the spring core assembly apparatus 51, the following spring string at the head end of the continuous spring string can be transferred to the first spring conveyor 3.

The sensors which are used in the device 1 for the length measurement can have different configurations. In one embodiment, the sensors 5, 5', 6, 6' can be configured as distance sensors. The sensors can be optical sensors. From the output signal representing the distance between pocket material and sensor, it can be determined when the longitudinal axis of the spring passes the corresponding sensor. By a suitable query of the position of the actuating drive of the first spring conveyor or of the program module of the control device which controls the actuating drive of the first spring conveyor, the length of a segment of the spring string at these points in time can be determined. For example, it is possible, depending on the position of the first spring conveyor when a longitudinal axis of the first spring of the spring string passes a sensor, and on the position of the first spring conveyor when a longitudinal axis of the $N_{s0}$th spring of the spring string passes the corresponding sensor at a later point in time, to determine an actual length of the segment from the longitudinal axis of the first spring to the longitudinal axis of the $N_{s0}$th spring which this segment has upstream of the second spring conveyor. Correspondingly, a length of the segment can also be determined depending on positions of weld seams.

Figure 7:
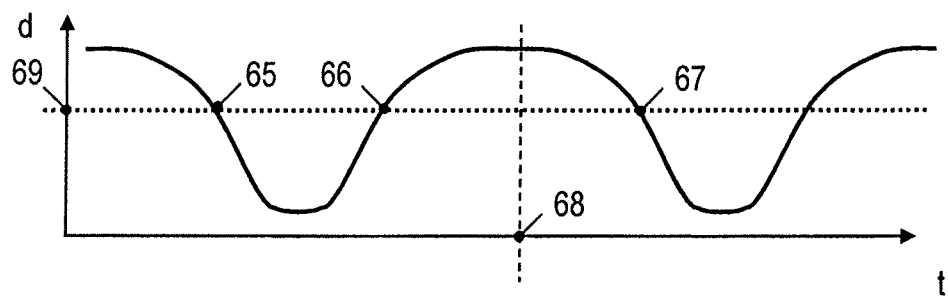
FIG. 7 illustrates an output signal of a sensor used to determine segment lengths.

FIG. 7 is a schematic representation of a distance signal which can be detected by the sensors 5, 5', 6, 6', 7. At a minimum distance between sensor and pocket material, the longitudinal axis of the pocketed spring is situated at the level of the corresponding sensor. Similarly, the positions of weld seams may also be determined from the distance signal.

The control device 9 can compare the measured distance with a threshold value 68 which is chosen to be greater than the smallest distance between sensor and pocket material and less than the greatest distance between sensor and pocket material. The points 65, 66 and 67 at which the measured distance reaches the threshold value are determined.

On reaching the threshold value at 66 and 67, which correspond to opposite flanks of successive springs, the position of the actuating drive of the first spring conveyor 3 can be queried in each case. By averaging these two values, the position at which the weld seam between the springs passes the sensor can be determined.

A frontmost weld seam of the spring string can be calculated by extrapolation.

If desired or necessary, it may also be determined when a centre axis of the spring passes the sensor. On reaching the threshold value at 65 and 66, the position of the actuating drive of the first spring conveyor 3 can be queried in each case. By averaging these two values, the position at which the longitudinal axis of the spring passes the sensor can be determined.

Figure 8:
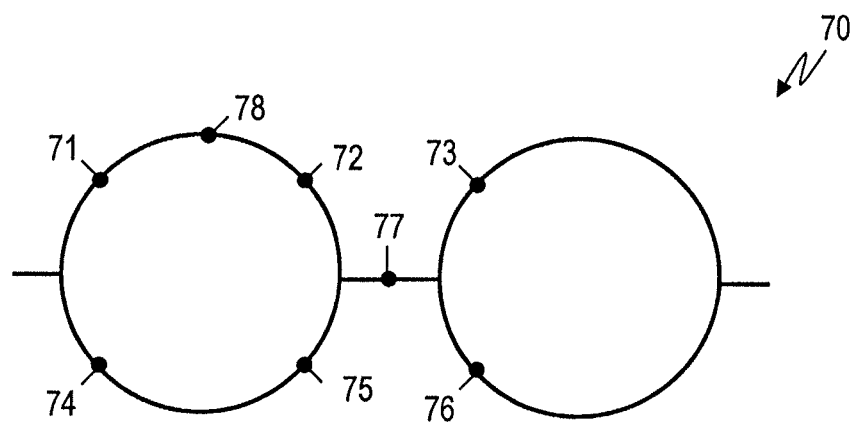
FIG. 8 illustrates measurement points on a pocketed spring.

FIG. 8 illustrates this measurement procedure with a pair of pocketed springs 70. In each case, the distance reaches the threshold value 69 when the points 71, 72 and 73 pass the sensor. By averaging the positions of the actuating drive, the position of the actuating drive at which the point 77 corresponding to the weld seam passes the sensor is determined. At this point in time or at the corresponding position of the actuating drive, the weld seam between the springs is guided past the sensor.

By this procedure, the position of the actuating drive at the point in time at which the point 77 passes the sensor can be reliably determined. A direct determination of the position of the weld seam from the distance signal, which may have a greater susceptibility to errors, can thus be avoided.

Correspondingly, the position of the actuating drive at which the point 78 passes the sensor can also be determined.

If a pair of sensors is provided at opposite sides of the spring string, it is possible to proceed correspondingly with the output signal of the further sensor of the pair. The distance of the pocket material from the further sensor in each case reaches the threshold value 68 when the points 74, 75 and 76 pass the sensor. By averaging the positions of the actuating drive, the position of the actuating drive at which the point 77 is guided past the sensor is calculated.

Figure 9:
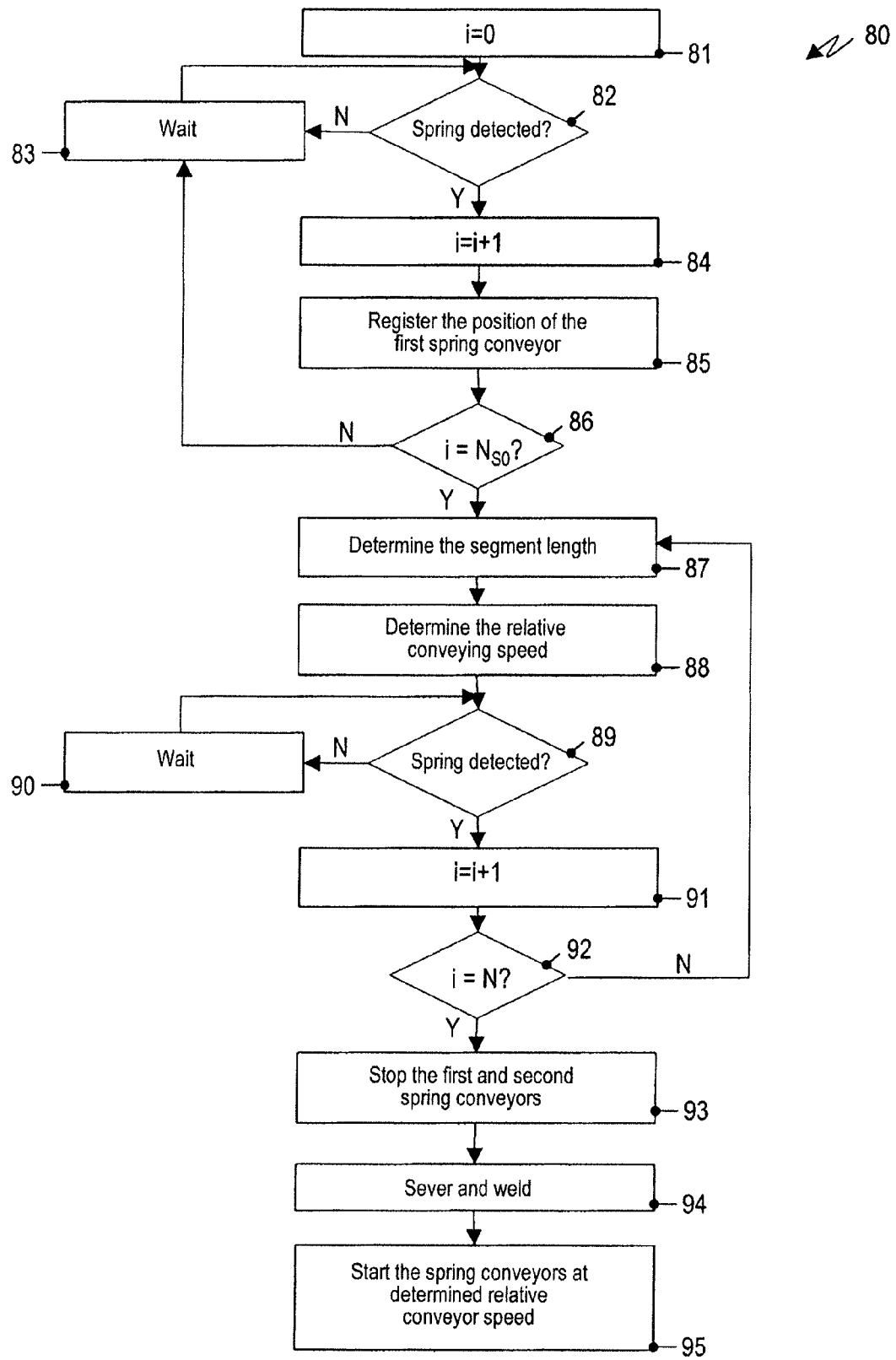
FIG. 9 is a flow diagram representation of a method for conveying a spring string.

FIG. 9 is a flow diagram representation of a method 80 for conveying a spring string which comprises interconnected pocketed springs. The method can be carried out by the control device 9. The spring string is conveyed by a first and a second spring conveyor. The first spring conveyor conveys the spring string to the second spring conveyor.

At 81 a counter i for springs which pass a sensor is initialised.

At 82 it is checked whether a spring which is guided past the sensor is detected. The detection of the spring takes place in the conveying direction upstream of the second spring conveyor. The detection of the spring can take place at an intake area of the first spring conveyor or upstream of the intake area of the first spring conveyor.

If at 82 no spring is detected, the method returns to check 82 after a waiting time 83. This is repeated until a spring is detected.

If at 82 it is determined that a spring which is guided past the sensor is detected, the counter i is incremented at 84.

At 85 the position of the first spring conveyor is registered. For this purpose, a position of an actuating drive of the first spring conveyor is queried and stored. The position may be determined as described with reference to FIGS. 7 and 8.

At 86 it is checked whether the count i equals a preset whole number $N_{s0}$. If i does not equal $N_{s0}$, the method continues at 83. The number $N_{s0}$ corresponds to the number of springs in the first segment for which the relative conveying speed is determined depending on a comparison between actual and desired length. The number $N_{s0}$ is chosen here such that the segment with $N_{s0}$ springs can be fully positioned on the first spring conveyor. The number $N_{s0}$ is less than the total number of springs of the spring string.

If the count i equals the number $N_{s0}$, a segment length is determined at 87. For this purpose, a difference of the positions registered for different springs at 85 can be calculated. If i equals $N_{s0}$, a difference of the position of the first spring conveyor registered for the weld seam downstream of the $N_{s0}$th spring and of the position of the first spring conveyor registered for the weld seam upstream of the first spring can be determined. This represents the length of the segment. The position of the first spring conveyor for the weld seam upstream of the first spring can be determined by extrapolation.

At 88 there is determined a relative conveying speed which is set between the conveying speed of the second spring conveyor and the conveying speed of the first spring conveyor while the corresponding segment of the spring string is being delivered from the first spring conveyor to the second spring conveyor. The relative conveying speed is set depending on the length determined at 87. The relative conveying speed can be defined as the speed quotient which is defined depending on the quotient between the actual length of the segment determined at 87 and a desired length of the segment. The relative conveying speed can be used to drive the second spring conveyor accordingly, when both the first and the second spring conveyor conveys the spring string.

At 89 it is checked whether a further spring which is guided past the sensor is detected. The detection of the spring takes place in the conveying direction upstream of the second spring conveyor. The detection of the spring can take place at an intake area of the first spring conveyor or upstream of the intake area of the first spring conveyor.

If at 89 no spring is detected, the method returns to check 89 after a waiting time 90. This is repeated until a spring is detected.

If at 89 it is determined that a spring which is guided past the sensor is detected, the counter i is incremented at 91.

At 92 it is checked whether the total number N of springs of the spring string has been reached. The total number N can be preset in a user-defined manner. If i does not equal N, the method returns to 87. The determination of the desired length is now repeated for the new segment comprising the first to $(N_{s0}+k)$th spring. Here, k is a positive whole number. Correspondingly, the determination and setting of the relative conveying speed is repeated. The relative conveying speed determined during the first pass at 88 can thus still be readjusted.

If the total number N of springs of the spring string has been reached, the first spring conveyor and the second spring conveyor are synchronously stopped at 93.

At 94 the pocket material downstream of the Nth spring is severed and welded.

At 95 the first spring conveyor and the second spring conveyor are synchronously started. The speeds here are set depending on a comparison of the actual length with the desired length of one of the previously measured segments of the spring string. In particular, a speed quotient between the conveying speed of the second spring conveyor and the conveying speed of the first spring conveyor can be set depending on a quotient between actual length and desired length of the corresponding segment.

The setting of new relative conveying speeds according to step 88 can also be continued after the starting at 95 until the entire spring string is transferred to the second spring conveyor.

The method 80 can be repeated subsequently for the following spring string.

The method 80 can comprise further steps. For example, monitoring functions can be integrated in order to check whether a spring is missing or a weld between pocketed springs has not been properly applied. In the event of an error, the operation of the device is stopped and a warning signal issued.

In the method 80 of FIG. 9, lengths of overlapping segments are determined. The relative conveying speed is correspondingly readjusted with an increasing number of springs in the segment, so that different relative conveying speeds are set successively.

Figure 10:
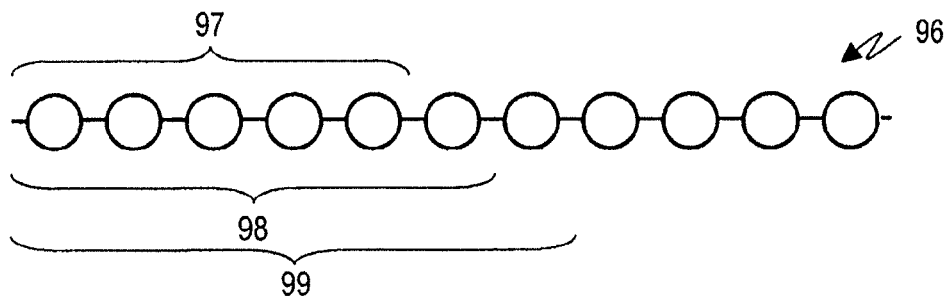
FIG. 10 is a schematic plan view of a spring string for explaining the method of FIG. 9.

FIG. 10 shows a spring string 96. Actual lengths of segments 97-99 are determined with the method 80. The relative conveying speed is set in accordance with an actual/desired comparison for the segments 97-99.

The control device 9 can perform further functions in parallel with the setting of a desired length of the spring string according to the method 80. This is explained with the aid of FIG. 11.

Figure 11:
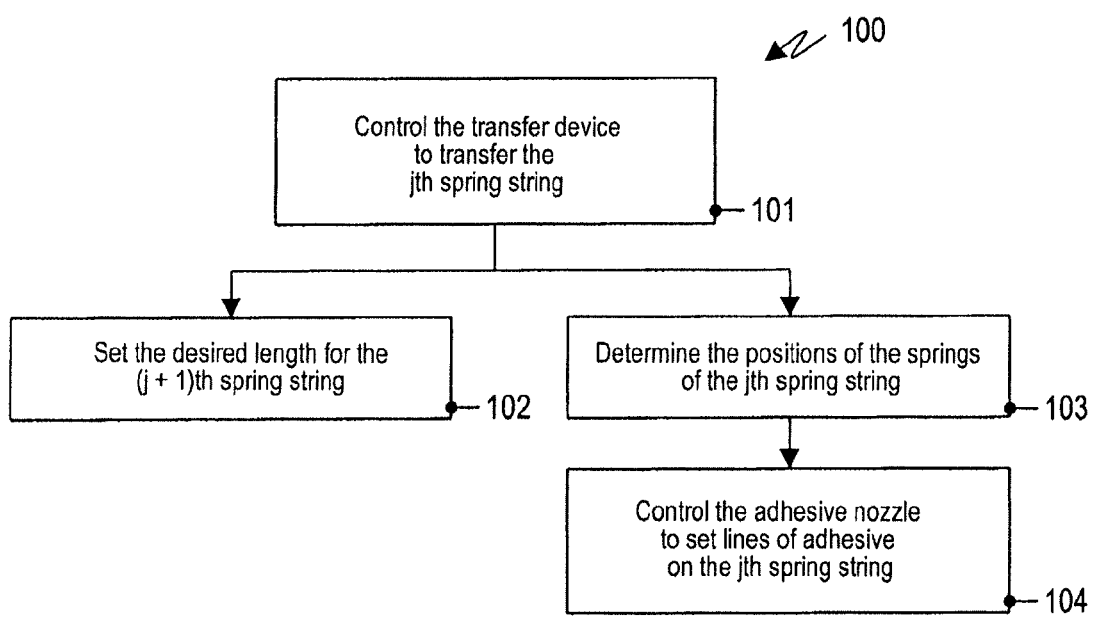
FIG. 11 is a flow diagram representation of a method for producing a pocket spring core.

FIG. 11 is a schematic flow diagram representation of a method 100 which can be carried out by the control device 9. The index j here denotes a spring string.

At 101 a transfer device is controlled in order to transfer the jth spring string from the second spring conveyor to the spring core assembly apparatus.

At 102 a desired length for the following, (j+1)th spring string is set. This can take place using the method 80 of FIG. 9.

In parallel with this, at 103 the positions along the conveying direction at which the springs of the jth spring string were arranged in their end position on the second spring conveyor are determined. The determination of the positions can be carried out depending on the positions of the first spring conveyor registered at 85 in the method 80 and on the set relative conveying speeds.

At 104 an adhesive nozzle is controlled to apply adhesive to the jth spring string depending on the positions determined at 103. Here, an opening state of the adhesive nozzle can be controlled by On/Off signals while the adhesive nozzle is guided past the spring string at a constant speed. In this way, lines of adhesive or spots of adhesive are applied with good accuracy to the jth spring string, which allow bonding to the (j+1)th spring string.

The method 100 can be repeated until the pocket spring core is completely joined together from a plurality of spring strings.

In the devices and methods, various parameters, such as the total number of springs in a spring string, the number of springs in a segment, the desired length of segments or the desired length of the entire spring string can be presettable in a user-defined manner. This can be achieved by suitable programming of the control device 9.

Figure 13:
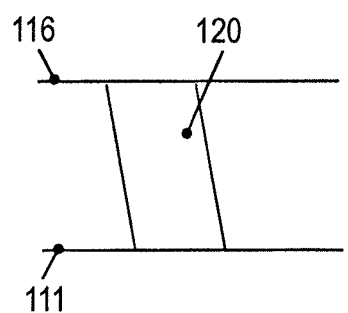
FIG. 13 is a schematic side view for explaining a correction of tilts.

FIG. 13 is a schematic perspective view of a first spring conveyor 3. A first spring conveyor 3 having the configuration now described can be used as the first spring conveyor in the device of FIGS. 1-6.

The first spring conveyor 3 has a pair of conveying device 111 and 112. The conveying devices 111 and 112 are spaced from one another perpendicularly to the conveying direction, so that a gap 113 is formed between the conveying devices 111 and 112. The conveying devices 111 and 112 can each be formed as a circulating conveying belt. The conveying devices 111 and 112 are spaced from one another in a direction transverse to the longitudinal axis of the springs.

The gap 113 is dimensioned such that the engaging element 12 of the transfer device can travel into the gap 113. A low-slip transfer of springs is thereby facilitated.

The first spring conveyor 3 has a further pair of conveying device 116 and 117. The further pair of conveying device 116 and 117 is spaced from the pair having the conveying devices 111 and 112 in a direction perpendicular to the conveying direction. The pair having the conveying device 116 and 117 and the pair having the conveying devices 111 and 112 can be spaced from one another in the vertical direction. The conveying devices 116 and 117 of the further pair can be spaced from one another in the horizontal direction.

The conveying devices 116 and 117 are spaced from one another perpendicularly to the conveying direction, so that a gap 118 is formed between the conveying devices 116 and 117. The conveying devices 116 and 117 can each be formed as a circulating conveying belt. The conveying devices 116 and 117 are spaced from one another in a direction perpendicular to the longitudinal axis of the springs, i.e. in a horizontal direction.

The gap 118 is dimensioned such that the engaging element 11 of the transfer device can travel into the gap 118. A low-slip transfer of springs is thereby facilitated.

Regardless of whether the upper and lower conveying belts of the first spring conveyor are divided into two or not, separate drives 16a and 16b can be provided for the lower conveying belt (or the lower conveying belts) and the upper conveying belt (or the upper conveying belts). For example, the drive 16a can drive the conveying belts 111 and 112. The drive 16b can drive the conveying belts 116 and 117. If only one upper and one lower conveying belt is provided, the drive 16a can drive the lower conveying belt, and the drive 16b can drive the upper conveying belt.

The drive 16a and the drive 16b can each be configured as an actuating drive.

Similarly, the second spring conveyor 4 can also have a separate drive 17a for a lower conveying belt and a separate drive 17b for an upper conveying belt. The drives 17a and 17b can be connected to the controller 9. The controller 9 can control the advance of the lower conveying belt and of the upper conveying belt independently of one another. The drive 17a and the drive 17b can each be configured as an actuating drive.

If lower and upper conveying belts of the first spring conveyor 3 and/or a lower and an upper conveying belt of the second spring conveyor 4 can be driven independently of one another, a tilt of springs can be detected in the first spring conveyor. The tilt can be corrected by the device for conveying the spring string.

To detect such a tilt, the sensors 5 and 5' can be arranged such that they are offset from one another in a first direction and a second direction which are both perpendicular to the conveying direction. The sensors 5 and 5' are arranged at opposite sides of the first spring conveyor 3. Furthermore, the sensors 5 and 5' are arranged at different heights relative to the lower conveying belt 111 and 112, respectively. Such an arrangement allows detection of a tilt of springs of the spring string.

A correction of the tilt can take place, for example, in the second spring conveyor 4. For this purpose, the separate drives 17a and 17b can be controlled by the controller 9 such that the tilt is corrected in a final movement. In determining the final movement, the controller 9 can take account of the relative conveying speeds at which the first spring conveyor 3 and the second spring conveyor 4 have previously advanced the springs.

FIG. 13 is a schematic representation of a pocketed spring 120. The spring 120 is conveyed by the first spring conveyor 3. The longitudinal axis of the spring 120 is, however, not perpendicular to the conveying direction. In order to correct such a tilt, the control device 9 can be configured such that it controls the actuating drives 16a and 16b independently of one another. In doing so, the advance of the upper and lower conveying belts can be set such that, at the end of the first spring conveyor, i.e. upon the transfer to the second spring conveyor, the longitudinal axis of the spring 120 is perpendicular to the conveying direction.

Devices and methods for conveying springs to a spring core assembly apparatus according to various exemplary embodiments have been described with reference to the figures. Modifications of the exemplary embodiments described in detail can be realised in further exemplary embodiments.

While in the context of exemplary embodiments, a segmentwise adaptation of relative conveying speeds to compensate for undesired deviations of segment lengths have been described, the devices and methods can also be employed to produce specifically segments of different spring density.

In the context of exemplary embodiments, spring conveyors which have two circulating, spaced conveying belts have been described. Such a configuration allows a simple adaptation to different spring heights. However, other configurations of the spring conveyors can also be employed.

In the context of exemplary embodiments, spring conveyors in which the springs are transported with vertically directed longitudinal axes and subsequently assembled in this orientation to form the pocket spring core have been described. In further configurations, the first and second spring conveyor can be configured such that they convey the springs with a horizontal orientation of their longitudinal axes. The second spring conveyor can be pivotable by 90° about the conveying direction before the spring string is transferred to the spring core assembly apparatus.

The devices and methods according to various exemplary embodiments of the invention allow an adaptation of a length of a spring string to be performed, in which the space requirements required therefor can be kept moderate compared with conventional solutions. The devices and methods can be employed generally for conveying pocket spring strings.

The invention claimed is:

1. A device for conveying a spring string which has a plurality of interconnected pocketed springs, the device comprising:

a first spring conveyor and a second spring conveyor, the first spring conveyor being adapted to convey the spring string to the second spring conveyor, a sensor device which is adapted to detect lengths of a plurality of segments of the spring string when the spring string is conveyed past a sensor of the sensor device arranged in the conveying direction upstream of the second spring conveyor, and a control device coupled to the sensor device, and coupled to a drive of the first spring conveyor and/or a drive of the second spring conveyor, and which is adapted to time-sequentially set, in an operating state of the device in which both the first spring conveyor and the second spring conveyor convey the spring string, a plurality of relative conveying speeds between a conveying speed of the second spring conveyor and a conveying speed of the first spring conveyor, depending on the detected lengths.

2. The device of claim 1, wherein the sensor device is adapted to detect lengths of the plurality of segments, the plurality of segments overlapping one another and different segments having a different number of springs, and wherein the control device is adapted to adapt an initially set relative conveying speed in order to set the plurality of relative conveying speeds, depending on the detected lengths.

3. The device of claim 1, wherein the control device is adapted to calculate positions of a plurality of springs of the spring string on the second spring conveyor, depending on the set relative conveying speeds.

4. The device of claim 1, further comprising:
a separating-off device for separating off the spring string from a continuous spring string,
wherein the control device is coupled to the separating-off device and is adapted to set at least one of the plurality of relative conveying speeds before activating the separating-off device to separate off the spring string.

5. The device of claim 1, further comprising:
a transfer device for transferring the spring string to the first spring conveyor, the transfer device being mounted so as to be movable in the conveying direction and being transferrable from a holding state for holding the spring string to a releasing state for releasing the spring string, depending on a control signal of the control device,
wherein the control device is adapted to generate the control signal selectively when a difference between the conveying speed of the first spring conveyor and a movement speed of the transfer device in the conveying direction is of an amount which is less than a preset threshold value.

6. The device of claim 5, wherein the first spring conveyor has at least two conveying devices spaced from one another transversely to the conveying direction, the transfer device being configured and arranged to travel into a gap between the conveying devices spaced transversely to the conveying direction.

7. The device of claim 5, wherein the sensor device comprises a further sensor which is arranged in the conveying direction upstream of the first spring conveyor and serves for detecting the lengths of the plurality of segments, and wherein the control device is adapted to set the plurality of relative conveying speeds furthermore depending on an output signal of the further sensor.

8. The device of claim 1, wherein a length of the first spring conveyor is less than a length of the spring string on the first spring conveyor.

9. The device of claim 1, wherein the first spring conveyor has an actuating drive and the control device is adapted to query positions of the actuating drive to determine the lengths depending on an output signal of the sensor.

10. The device of claim 1, wherein the sensor device has at least two sensors spaced in a direction transverse to the conveying direction in order to detect a tilt of a spring, and wherein the first spring conveyor and/or the second spring conveyor has at least two actuating drives, and wherein the control device is adapted to control the at least two actuating drives depending on a tilt of the spring detected by the sensor device.

11. An installation for producing a pocket spring core, the installation comprising a device for conveying a spring string according to claim 1 and a spring core assembly apparatus which is adapted to join together a plurality of spring strings, conveyed by the device, to form a pocket spring core.

12. The installation of claim 11, wherein the device for conveying is formed as a device according to claim 3, and wherein the control device is adapted to control the spring core assembly apparatus depending on the determined positions of a plurality of springs of the spring string on the second spring conveyor.

13. The installation of claim 12, wherein the spring core assembly apparatus comprises an application device for applying adhesive, and wherein the control device is adapted to control an adhesive delivery of the application device as a function of time, depending on the determined positions of a plurality of springs of the spring string on the second spring conveyor.

14. A method for conveying a spring string which has a plurality of interconnected pocketed springs to a spring core assembly apparatus,
wherein the spring string is conveyed by a first spring conveyor and by a second spring conveyor downstream of the first spring conveyor,
wherein lengths of a plurality of segments of the spring string are each determined before the corresponding segment is fully positioned on the second spring conveyor, and
wherein a plurality of relative conveying speeds between a conveying speed of the second spring conveyor and a conveying speed of the first spring conveyor are time-sequentially set, depending on the detected lengths, while both the first spring conveyor and the second spring conveyor convey the spring string.

15. The method of claim 14, further comprising detecting lengths of a plurality of segments of the spring string using a sensor device when the spring string is conveyed past a sensor of the sensor device arranged upstream of the second spring conveyor, and a control device coupled to the sensor device, and coupled to a drive of the first spring conveyor and/or a drive of the second spring conveyor, the control device being adapted to time-sequentially set relative conveying speeds between a conveying speed of the second spring conveyor and a conveying speed of the first spring conveyor, depending on the detected lengths of the segments of the spring string.

16. The method of claim 15, wherein the sensor device is adapted to detect lengths of the plurality of segments, the plurality of segments overlapping one another and different segments having a different number of springs, and wherein the control device is adapted to adapt an initially set relative conveying speed in order to set the plurality of relative conveying speeds, depending on the detected lengths.

17. The method of claim 14, further comprising calculating positions of a plurality of springs of the spring string on the second spring conveyor using the control device, depending on the set relative conveying speeds.

18. The method of claim 14, further comprising separating off the spring string from a continuous spring string using a separating-off device wherein the control device is coupled to the separating-off device and is adapted to set at least one of the plurality of relative conveying speeds before activating the separating-off device to separate off the spring string.

19. The method of claim 14, further comprising transferring the spring string to the first spring conveyor using a transfer device, the transfer device being mounted so as to be movable in the conveying direction and being transferrable from a holding state for holding the spring string to a releasing state for releasing the spring string, depending on a control signal of the control device and wherein the control device is adapted to generate the control signal selectively when a difference between the conveying speed of the first spring conveyor and a movement speed of the transfer device in the conveying direction is of an amount which is less than a preset threshold value.

20. The method of claim 14, wherein the first spring conveyor has at least two conveying devices spaced from one another transversely to the conveying direction, the transfer device being configured and arranged to travel into a gap between the conveying devices spaced transversely to the conveying direction.

21. The method of claim 15, wherein the sensor device comprises a further sensor which is arranged in the conveying direction upstream of the first spring conveyor and serves for detecting the lengths of the plurality of segments, and wherein the control device is adapted to set the plurality of relative conveying speeds furthermore depending on an output signal of the further sensor.

22. The method of claim 14, wherein a length of the first spring conveyor is less than a length of the spring string on the first spring conveyor.

23. The method of claim 15, wherein the first spring conveyor has an actuating drive and the control device is adapted to query positions of the actuating drive to determine the lengths depending on an output signal of the sensor.

24. The method of claim 14, further comprising detecting a tilt of a spring using the sensor device, the sensor device having at least two sensors spaced in a direction transverse to the conveying direction, and wherein the first spring conveyor and/or the second spring conveyor has at least two actuating drives, and wherein the control device is adapted to control the at least two actuating drives depending on a tilt of the spring detected by the sensor device.

* * * * *